(12) United States Patent
Kano (10) Patent No.: US 8,743,436 B2
(45) Date of Patent: Jun. 3, 2014

(54) COLOR INFORMATION PROCESSING APPARATUS AND RECORDING MEDIUM

(75) Inventor: Kyoko Kano, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 861 days.

(21) Appl. No.: 12/878,477

(22) Filed: Sep. 9, 2010

(65) Prior Publication Data

US 2011/0058197 A1 Mar. 10, 2011

(30) Foreign Application Priority Data

Sep. 10, 2009 (JP) ................. 2009-209658

(51) Int. Cl.
*G06K 15/00* (2006.01)
*H04N 1/40* (2006.01)
*H04N 1/405* (2006.01)
*G06F 3/12* (2006.01)
*H04N 1/46* (2006.01)
*G03F 3/08* (2006.01)
*G03F 3/10* (2006.01)

(52) U.S. Cl.
USPC .......... 358/518; 358/2.1; 358/3.01; 358/3.13; 358/3.21; 358/3.24; 358/1.13; 358/504; 358/527

(58) Field of Classification Search
USPC ............ 358/1.9, 519, 1.6, 1.13, 3.21, 3.22, 358/3.23, 3.24, 504, 518, 520, 2.1, 3.01, 358/3.13, 527
See application file for complete search history.

(56) References Cited

U.S. PATENT DOCUMENTS

| | | | | |
|---|---|---|---|---|
| 5,748,342 A | * | 5/1998 | Usami | 358/500 |
| 5,987,165 A | * | 11/1999 | Matsuzaki et al. | 382/162 |
| 6,269,184 B1 | * | 7/2001 | Spaulding et al. | 382/167 |
| 6,987,519 B2 | * | 1/2006 | Kumada et al. | 345/603 |
| 7,158,146 B2 | * | 1/2007 | Ohga | 345/589 |
| 7,180,524 B1 | * | 2/2007 | Axelrod | 345/593 |
| 7,576,890 B2 | * | 8/2009 | Peiro et al. | 358/1.9 |
| 7,706,604 B2 | * | 4/2010 | Berns et al. | 382/162 |
| 7,706,605 B2 | * | 4/2010 | Fukao et al. | 382/162 |
| 7,764,411 B2 | * | 7/2010 | Kishimoto | 358/518 |
| 7,986,448 B2 | * | 7/2011 | Hayase | 358/520 |
| 8,064,690 B2 | * | 11/2011 | Suzuki | 382/162 |
| 8,125,686 B2 | * | 2/2012 | Akado et al. | 358/1.9 |
| 8,204,304 B2 | * | 6/2012 | Suzuki | 382/167 |

FOREIGN PATENT DOCUMENTS

| | | |
|---|---|---|
| JP | 08009179 A | 1/1996 |
| JP | 09135360 A | 5/1997 |
| JP | 10032724 A | 2/1998 |
| JP | 2000-217007 A | 8/2000 |
| JP | 2005-084932 A | 3/2005 |
| JP | 2009038593 A | 2/2009 |

OTHER PUBLICATIONS

Rejection of the Application, dated Dec. 18, 2012, issued in corresponding JP Application No. 2009-209658, 4 pages in English and Japanese.

* cited by examiner

*Primary Examiner* — Barbara Reinier
*Assistant Examiner* — Jonathan Beckley
(74) *Attorney, Agent, or Firm* — Sughrue Mion, PLLC (57) ABSTRACT

A color information processing apparatus includes a mapping section for mapping a designated color that lies outside of the range of a gamut of a printing apparatus to the range of the gamut according to a plurality of mapping techniques, and a display device for simultaneously displaying the designated color and a plurality of colors mapped by the mapping section. For example, the display device simultaneously displays the designated color and colors mapped by the mapping section adjacent to each other.

9 Claims, 8 Drawing Sheets

COLOR INFORMATION PROCESSING APPARATUS AND RECORDING MEDIUM

CROSS-REFERENCE TO RELATED APPLICATION

This application is based upon and claims the benefit of priority from Japanese Patent Application No. 2009-209658 filed on Sep. 10, 2009, of which the contents are incorporated herein by reference.

BACKGROUND OF THE INVENTION

1. Field of the Invention

The present invention relates to a color information processing apparatus and a recording medium for mapping a designated color to the gamut of a printing apparatus in the event that the designated color lies outside of the gamut.

2. Description of the Related Art

Heretofore, a technology has existed for mapping a designated color, which is designated by the user, to the gamut of a printing apparatus by analyzing preferences of the user, in the event that the designated color lies outside the range of the gamut (see Japanese Laid-Open Patent Publication No. 2005-084932).

According to the technology disclosed in Japanese Laid-Open Patent publication No. 2005-084932, although the designated color can be mapped to the range of the gamut, the designated color is mapped only in one pattern, because such mapping is performed by analyzing preferences of the user. If a plurality of mapping processes are carried out, then since it is not easy to compare the mapping processes as to how color reproduction of the mapping processes is changed, it is necessary to repeat the mapping processes a number of times until the most suitable mapping process is selected.

SUMMARY OF THE INVENTION

An object of the present invention is to provide a color information processing apparatus and a recording medium, which are capable of easily identifying how color reproduction changes in a plurality of mapping processes.

To achieve the above object, in accordance with the present invention, there is provided a color information processing apparatus comprising a mapping section for mapping a designated color outside of the range of a gamut of a printing apparatus to the range of the gamut according to a plurality of mapping techniques, and a display device for simultaneously displaying the designated color and a plurality of colors mapped by the mapping section.

The display device may simultaneously display both the designated color and the colors mapped by the mapping section adjacent to each other.

The display device may simultaneously display a mode in which the designated color and the colors mapped by the mapping section are adjacent to each other, and a mode in which the designated color and the colors mapped by the mapping section are not adjacent to each other.

The display device may display an achromatic color as a background color for the designated color and the colors mapped by the mapping section.

The display device may display a chromatic color as a background color for the designated color and the colors mapped by the mapping section.

The mapping section may use at least one of a mapping technique based on impression matching, a mapping technique based on lightness matching, a mapping technique based on saturation matching, and a mapping technique based on minimum distance.

The display device may display, on coordinates, the color values of the colors mapped by the mapping section.

The color information processing apparatus may further comprise a first selector for selecting one of the mapping techniques, and a color adjuster for adjusting a color mapped according to the selected one of the mapping techniques, which is selected by the first selector.

The color information processing apparatus may further comprise an image data generator for generating image data of a color chart including a plurality of color patches having different lightness and chromaticity values in a color space around the color mapped according to the selected one of the mapping techniques, which is selected by the first selector, or the color adjusted by the color adjuster, and a second selector for selecting one of colors contained in the color chart, which is printed by the printing apparatus based on the image data.

The image data generator may generate image data of a color chart including a plurality of color patches, which represent the color selected by the second selector as a color under a light source at a reference color temperature, and colors under light sources at different color temperatures.

The image data generator may generate image data of a color chart including a plurality of color patches, which represent the color selected by the second selector as a color printed on a print medium of a reference material, and colors printed on print mediums of different materials.

To achieve the above object, in accordance with the present invention, there also is provided a recording medium storing a program for enabling a computer to function as a mapping section, for mapping a designated color outside of the range of a gamut of a printing apparatus to the range of the gamut according to a plurality of mapping techniques, and a display device for simultaneously displaying the designated color and a plurality of colors mapped by the mapping section.

According to the present invention, the user of the color information processing apparatus can visually recognize differences between colors mapped according to various mapping techniques, and can easily compare the color values of the designated colors and the mapped colors.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A color information processing apparatus and a program for enabling a computer to function as a color information processing apparatus according to a preferred embodiment of the present invention will be described in detail below with reference to the accompanying drawings.

Figure 1:
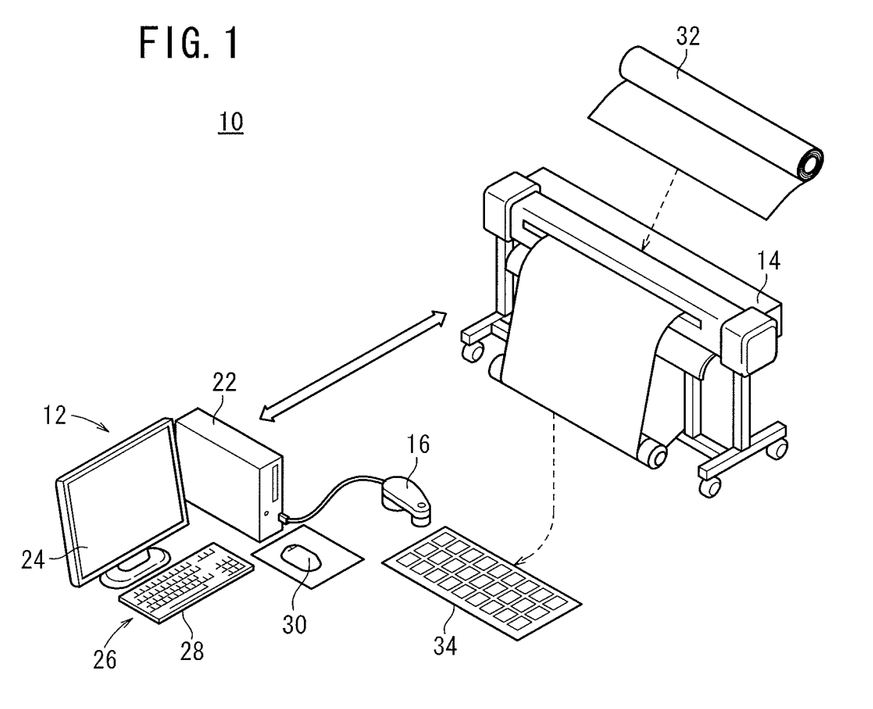
FIG. 1 is a perspective view of a print processing system incorporating a color information processing apparatus according to an embodiment of the present invention.

FIG. 1 shows in perspective a print processing system 10 incorporating a color information processing apparatus 12 according to an embodiment of the present invention. As shown in FIG. 1, the print processing system 10 includes, in addition to the color information processing apparatus 12, a printing apparatus 14, and a color value acquisition unit 16.

The color information processing apparatus 12 serves to map color values that lie outside the range of a gamut to color values within the range of the gamut, and also to perform a color converting process. The color converting process is a process for converting colors, which do not depend on devices (device-independent colors), into colors that depend on devices (device-dependent colors). Device-independent colors are colors that cannot be printed by the printing apparatus 14, or colors that cannot be displayed by a display unit (display device) 24 of the color information processing apparatus 12. Device-dependent colors are colors that can be printed by the printing apparatus 14, or colors that can be displayed by the display unit 24. The color information processing apparatus 12 comprises a main unit having a CPU, a DSP, a memory, etc., the display unit 24 for displaying color images, and an input device 26 including a keyboard 28 and a mouse 30.

The printing apparatus 14 comprises an inkjet printing apparatus for producing a color image based on a combination of basic inks made up of colors C, M, Y, K, and optional inks of light colors such as LC, LM, etc., and W (white). The printing apparatus 14 may comprise a TA printer, a thermal transfer printer, a dry-type electrophotographic printer, a tandem printer, a 4-cycle printer, or the like. The printing apparatus 14 controls propulsion of inks onto a print medium 32 based on a print control signal received from the color information processing apparatus 12, which instructs the printing apparatus 14 to print a color image on the print medium 32, thereby producing a print 34. The print 34 shown in FIG. 1 comprises a color chart, including a plurality of color patches.

The color value acquisition unit 16 acquires color values of a designated color. The color value acquisition unit 16 includes a colorimeter, and acquires the color values of a designated color by measuring the color values with the colorimeter. Alternatively, rather than acquiring the color values of a designated color through the color value acquisition unit 16, the main unit 22 may acquire color values of a designated color from an external device, or may acquire color values of a designated color, which are entered by a user of the print processing system 10 through the input device 26. Such color values refer not only to tristimulus values X, Y, Z, the coordinates L*, a*, b* of a uniform color space, etc., but also a distribution of optical physical values with respect to wavelengths, e.g. spectral intensity, spectral reflectivity, or spectral transmittance. In the illustrated embodiment, the color value acquisition unit 16 acquires color values in a color space represented by a CIEL*a*b* color system.

Figure 2:
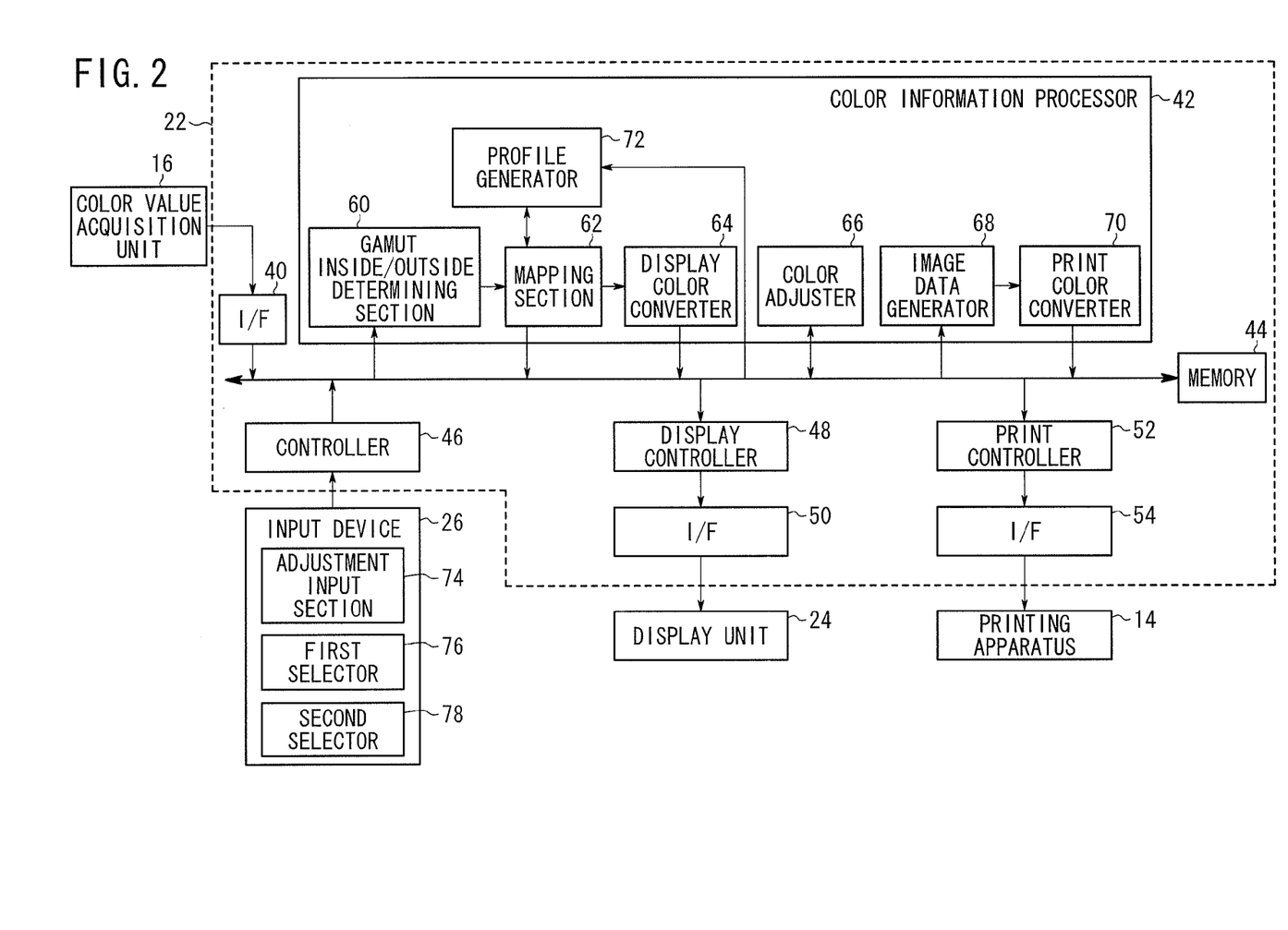
FIG. 2 is an electric block diagram of the print processing system shown in FIG. 1.

FIG. 2 is an electric block diagram of the print processing system 10. The main unit 22 comprises an I/F 40, a color information processor 42, a memory 44, a controller 46, a display controller 48, another I/F 50, a print controller 52, and another I/F 54. The controller 46 controls various components of the main unit 22, including the color information processor 42, the print controller 52, etc. The memory 44 stores programs and data therein required for the controller 46 to control various components of the main unit 22, and a color table of colors depending on color values. The memory 44 also stores therein data required in a processing sequence of the color information processor 42. The memory 44 may comprise a recording medium such as a nonvolatile memory, a hard disk, or the like.

The input device 26 outputs an operation signal to the controller 46 depending on an input action made by the user. The controller 46 performs control operations depending on the operation signal sent from the input device 26. The input device 26 includes an adjustment input section 74, a first selector 76, and a second selector 78. The adjustment input section 74, the first selector 76, and the second selector 78 are implemented by the keyboard 28 and/or the mouse 30.

The display controller 48 comprises a control circuit for controlling the display unit 24 under the control of the controller 46. More specifically, the display controller 48 outputs a display control signal via the I/F 50 to the display unit 24, thus energizing the display unit 24 to display an image thereon. The print controller 52 comprises a control circuit for controlling the printing apparatus 14 under the control of the controller 46. More specifically, the print controller 52 outputs a print control signal via the I/F 54 to the printing apparatus 14, thereby energizing the printing apparatus 14 to print an image.

The color information processor 42 serves to perform various color data processing processes, such as processes for mapping to the gamut the color of a designated color that lies outside the range of the gamut, and performing a color converting process. The color information processor 42 comprises a gamut inside/outside determining section 60, a mapping section 62, a display color converter 64, a color adjuster 66, an image data generator 68, a print color converter 70, and a profile generator 72. The color information processor 42 may be implemented through a processor, such as a DSP or the like.

The user prepares a color sample or the like of a designated color, and the color value acquisition unit 16 colorimetrically measures color values of the color sample. Color values of the designated color, which are acquired by the color value acquisition unit 16, are supplied via the I/F 40 to the memory 44, which stores the supplied color values. The gamut inside/outside determining section 60 reads from the memory 44 the color values of the designated color acquired by the color value acquisition unit 16, and determines whether or not the color values of the designated color fall within the range of a gamut (color reproduction range) that can be printed by the printing apparatus 14, i.e., whether or not the designated color is a color that can be reproduced by the printing apparatus 14. The gamut varies with the type of printing apparatus 14, and the memory 44 stores the gamut of the printing apparatus 14 that is used to print images. The gamut may be acquired from the printing apparatus 14. If the gamut inside/outside determining section 60 judges that the acquired color values of the designated color do not fall within the range of the gamut, i.e., the acquired color values of the designated color lie outside of the range of the gamut, then the gamut inside/outside determining section 60 outputs the acquired color values to the mapping section 62. If the acquired color values of the designated color fall within the range of the gamut, then the gamut inside/outside determining section 60 does not perform any processing operation.

The mapping section 62 maps color values of the designated color, which have been judged as falling outside of the range of the gamut by the gamut inside/outside determining section 60, to the range of the gamut according to a plurality of mapping techniques. The mapping process according to such mapping techniques is carried out based on predetermined profiles corresponding to the mapping techniques. According to the present embodiment, mapping is carried out according to four respective mapping techniques including, for example, a mapping technique based on impression matching, a mapping technique based on lightness matching, a mapping technique based on saturation matching, and a mapping technique based on minimum distance. The mapping section 62 includes a recorder, which has recorded therein a plurality of profiles corresponding to the respective mapping techniques.

In the mapping technique based on impression matching, mapping is performed by converting a designated color outside of the gamut and the gamut in a CIE CAM02 JCh space for minimizing color differences. The mapping technique based on impression matching is effective to convert colors suitably in a range from blue to magenta. The designated color mapped by the mapping technique based on impression matching is converted into color values in a color space represented by a CIEL*a*b* color system. The mapping technique based on lightness matching is a technique for mapping the color values of a designated color outside of the gamut to color values within the gamut, which match the lightness of the designated color outside the gamut, and which are spaced a minimum distance from the designated color outside the gamut. Color values in the gamut need not be spaced a minimum distance from the designated color outside the gamut, insofar as they match the lightness of the designated color outside the gamut. The mapping technique based on saturation matching is a technique for mapping the color values of a designated color outside of the gamut to color values within the gamut, which match the saturation of the designated color outside the gamut, and which are spaced a minimum distance from the designated color outside the gamut. Color values in the gamut need not be spaced a minimum distance from the designated color outside the gamut, insofar as they match the saturation of the designated color outside the gamut. The mapping technique based on minimum distance is a technique for mapping the color values of a designated color outside of the gamut to color values in the gamut, which are spaced a minimum distance from the designated color outside the gamut. The mapping section 62 stores the color values mapped by the above mapping techniques in the memory 44. The mapping section 62 is not limited to the aforementioned mapping technique based on impression matching, the mapping technique based on lightness matching, the mapping technique based on saturation matching, and the mapping technique based on minimum distance, but may also perform mapping using other mapping techniques known in the prior art.

Figure 3:
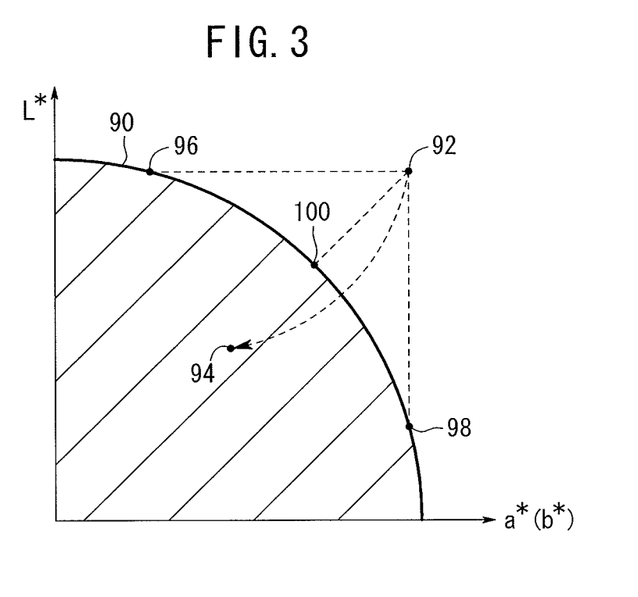
FIG. 3 is a diagram that illustrates the concept of a mapping process.

FIG. 3 is a diagram that illustrates the concept of a mapping process implemented by the mapping techniques of the present embodiment. In FIG. 3, a color space is shown as being two-dimensional for illustrative purposes. Since color values of a designated color in a color space represented by a CIEL*a*b* color system are acquired, the graph shown in the diagram of FIG. 3 has a vertical axis that represents L* and a horizontal axis that represents either a* or b*. The printing apparatus 14 has a gamut 90, which is shown in hatching in FIG. 3. In FIG. 3, the point 92 represents the color values of a designated color, which is judged as lying outside the range of the gamut 90. The point 94 represents color values, which are mapped by the mapping technique based on impression matching. The point 96 represents color values, which are mapped by the mapping technique based on lightness matching. The point 98 represents color values, which are mapped by the mapping technique based on saturation matching. The point 100 represents color values, which are mapped by the mapping technique based on minimum distance.

The display color converter 64 converts color values that are not dependent on devices into color values dependent on the display unit 24. For example, the display color converter 64 converts color values acquired by the color value acquisition unit 16 and color values mapped by the mapping section 62 (e.g., color values in a color space represented by a CIEL*a*b* color system) into color values dependent on the display unit 24 (e.g., R, G, B color values).

The color adjuster 66 adjusts color values mapped by the mapping section 62. The color adjuster 66 adjusts color values based on an input action to the adjustment input section 74 made by the user. The color adjuster 66 may adjust color values mapped according to a mapping technique selected by the first selector 76. The color adjuster 66 stores in the memory 44 adjusted color values that are determined by the user.

The image data generator 68 generates image data of a color chart, including color patches having different lightness values and chromaticity values in a color space around the mapped color values. Chromaticity values represent hue and saturation values. In other words, if a chromaticity value is changed, then either one of a hue value or a saturation value is changed. Since such color values are represented by values in a color space represented by a CIEL*a*b* color system, where L* represents lightness and a* and b* represent chromaticity, the image data generator 68 generates image data of a color chart, including color patches having a plurality of color values with different L*, a*, b* values around the mapped color values. The image data generator 68 outputs the generated image data to the print color converter 70.

Alternatively, the image data generator 68 may generate image data of a color chart, including color patches having a plurality of color values with different light source color temperatures. Alternatively, the image data generator 68 may generate image data of a color chart, including color patches having a plurality of color values with different print medium materials.

The print color converter 70 converts image data of the color chart into color values dependent on the printing apparatus 14. More specifically, the print color converter 70 converts the image data of the color chart into C, M, Y, K color values.

The profile generator 72 corrects a profile corresponding to either one of the mapping techniques, to result in a profile that turns the designated color equal to a color selected by the user. When the designated color is mapped using the generated profile, the designated color is expressed by the color selected by the user.

Operations of the print processing system 10 will be described below with reference to the flowcharts shown in FIGS. 4 and 5. When the colorimeter of the color value acquisition unit 16 colorimetrically measures a color sample or the like of a designated color, the color value acquisition unit 16 acquires color values of the designated color (step S2 in FIG. 4). Alternatively, rather than acquiring color values of a designated color through the color value acquisition unit 16, the main unit 22 may acquire color values of a designated color from an external device, or may acquire color values of a designated color, which have been entered by the user of the print processing system 10 through the input device 26. The color value acquisition unit 16 acquires color values that are device independent. In the illustrated embodiment, the color value acquisition unit 16 acquires color values in a color space represented by a CIEL*a*b* color system.

Then, the gamut inside/outside determining section 60 determines whether or not the color values acquired in step S2 fall within the range of the gamut of the printing apparatus 14 (step S4). If the gamut inside/outside determining section 60 judges that the color values lie outside of the range of the gamut, the mapping section 62 maps the color values acquired in step S2 to the range of the gamut, according to a mapping technique based on impression matching, a mapping technique based on lightness matching, a mapping technique based on saturation matching, and a mapping technique based on minimum distance (step S6). Such mapped color values are stored in the memory 44.

The mapping section 62 may map the color values according to techniques other than the mapping techniques discussed above. Further, the mapping section 62 needn't necessarily map the color values according to all four of the aforementioned mapping techniques referred to above. The mapping section 62 may also map the color values that lie outside of the range of the gamut to the range of the gamut, according to a plurality of different mapping techniques.

Then, the display controller 48 simultaneously displays for comparison the designated color and the mapped colors in positions adjacent to each other on the display unit 24 (step S8), so that the designated color and the mapped colors can be compared with each other on the display unit 24. At this time, the display controller 48 also displays coordinates associated with the mapped color values, and adjustment bars for adjusting the mapped color values. Before the designated color and the mapped colors are displayed by the display controller 48, the display color converter 64 converts the acquired color values of the designated color and the mapped color values into color values dependent on the display unit 24. Based on such converted color values, the display controller 48 displays the colors for comparison.

Figure 6:
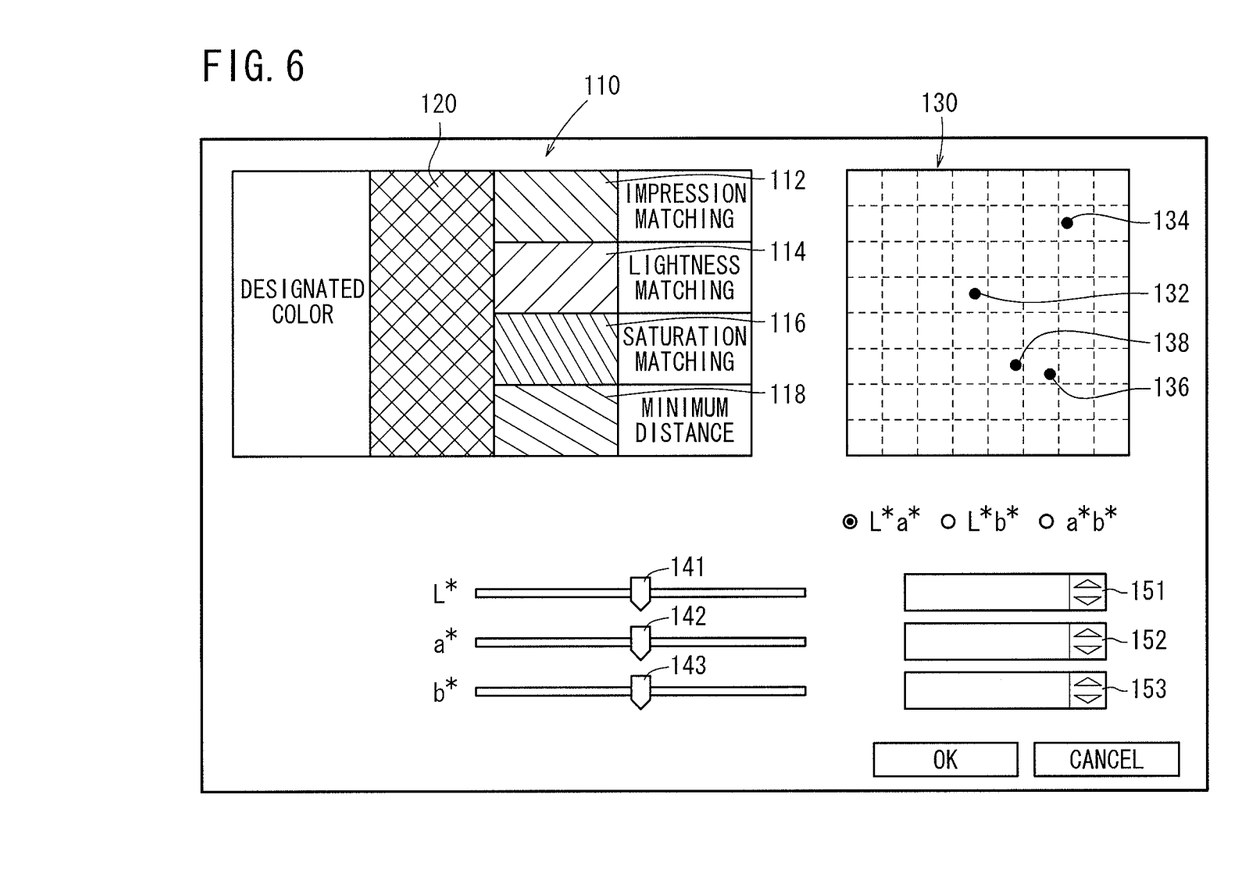
FIG. 6 is a view showing, by way of example, an image displayed for comparison on the screen of a display unit by a display controller shown in FIG. 2.

FIG. 6 shows, by way of example, an image displayed by the display controller 48 for comparison on the screen of the display unit 24. The image includes a display area 110 in an upper left portion thereof, in which colors are displayed for comparison. The display area 110 is divided into respective display areas 112, 114, 116, 118 and 120. Display area 112 displays a color mapped according to a mapping technique based on impression matching. Display area 114 displays a color mapped according to a mapping technique based on lightness matching. Display area 116 displays a color mapped according to a mapping technique based on saturation matching. Display area 118 displays a color mapped according to a mapping technique based on minimum distance. The display areas 112, 114, 116, 118, which are successively arranged downwardly in this order, are associated respectively with the words "IMPRESSION", "LIGHTNESS", "SATURATION", "MINIMUM DISTANCE" on the left side thereof, so as to allow the user to visually recognize the mapping techniques used to map the colors displayed in the display areas 112, 114, 116, 118. Display area 120, which is disposed on the left side of the display areas 112, 114, 116 and 118, displays a designated color. The display area 120 is associated with the words "DESIGNATED COLOR" on the left side thereof, so as to allow the user to visually recognize that the color displayed in the display area 120 is the designated color. When the designated color and the colors mapped by the mapping section 62 are displayed simultaneously in this manner, the user can compare the designated color and the mapped colors with each other at a glance. Since the designated color and the mapped colors are displayed adjacent to each other, the user also finds it easy to compare the designated color and the mapped colors on the screen of the display unit 24.

The displayed image additionally includes a display area 130 positioned on the right side of the display area 110, which displays coordinates associated with the mapped color values. Symbols, which represent the coordinate axes for coordinates displayed in the display area 130, are displayed below the display area 130. More specifically, the symbols include "L*a*" indicative of a vertical axis L* and a horizontal axis a*, "L*b*" indicative of a vertical axis L* and a horizontal axis b*, and "a*b*" indicative of a vertical axis a* and a horizontal axis b*. The user can select either one of these symbols using the keyboard 28 and the mouse 30 of the input device 26. The display controller 48 displays the mapped color values in a dot position (point) according to the coordinate axis represented by the selected symbol. FIG. 6 shows coordinates of the color values when the symbol "L*a*" is selected.

In the display area 130, the point 132 represents color values mapped according to the mapping technique based on impression matching. The point 134 represents color values mapped according to the mapping technique based on lightness matching. The point 136 represents color values mapped according to the mapping technique based on saturation matching. The point 138 represents color values mapped according to the mapping technique based on minimum distance. The points 132, 134, 136, 138 are displayed in colors corresponding to color values mapped according to the respective mapping techniques, in order to allow the user to visually recognize the mapping techniques used to map the color values. Alternatively, the points 132, 134, 136, 138 may be displayed in different simple colors (e.g., red, green, yellow, purple) rather than in colors of the mapped color values, or the points 132, 134, 136, 138 may be displayed in other ways so as to distinguish them from one another. For example, the points 132, 134, 136, 138 may be displayed in combination with letters or marks, which indicate the mapping techniques used to map the color values.

Figure 4:
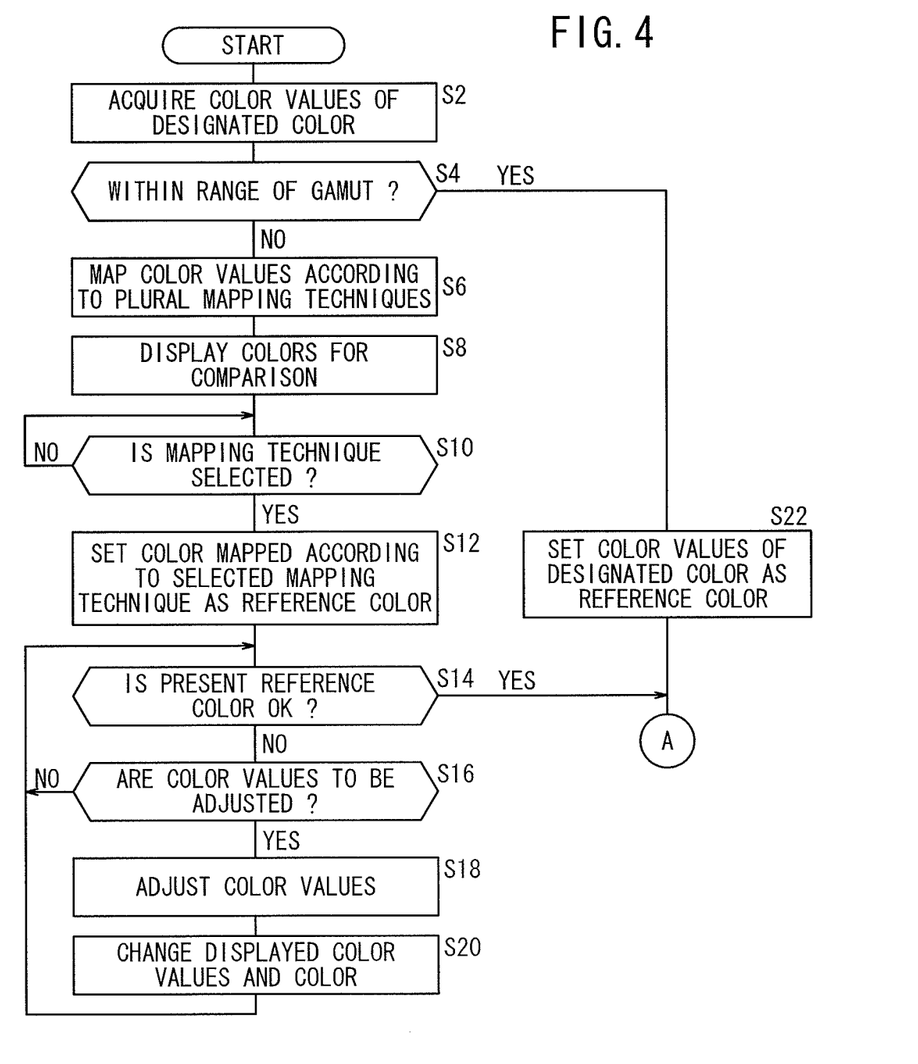
FIGS. 4 and 5 are flowcharts of an operation sequence of the print processing system shown in FIG. 1.

Referring back to the flowchart shown in FIG. 4, the controller 46 determines whether or not one of the mapping techniques has been selected by the user (step S10). The user can select one of the mapping techniques by operating the first selector 76. Using a mouse pointer or the like, the user may select one of the mapping techniques by selecting either one of the display areas 112, 114, 116, 118, or may select one of the mapping techniques by selecting either one of the coordinates (points 132 through 138) displayed in the display area 130 (see FIG. 6).

If the controller 46 judges that a mapping technique has not been selected by the user in step S10, then step S10 is repeated until a mapping technique is selected. If the controller 46 judges that a mapping technique has been selected by the user in step S10, then the controller 46 sets the color mapped by the selected mapping technique as a reference color (step S12). The user selects a mapping technique that has produced a color closest to the designated color, or a mapping technique that has produced a color close to a desired color. Color values of the set reference color are stored in the memory 44.

Then, the controller 46 determines whether or not the present reference color is OK (step S14). In other words, the controller 46 determines whether the designated color is expressed by the present reference color or not. When the user operates the input device 26 to click on an OK button, as shown in FIG. 6, the controller 46 judges that the present reference color is OK.

If the controller 46 judges that the present reference color is not OK in step S14, then the controller 46 determines whether or not color values of the present reference color are to be adjusted (step S16). If the adjustment input section 74 has adjusted the color values, then the controller 46 judges that the color values of the present reference color are to be adjusted.

If the controller 46 judges that color values of the present reference color are not to be adjusted in step S16, then control returns to step S14. If the controller 46 judges that color values of the present reference color are to be adjusted in step S16, then the color adjuster 66 adjusts the color values of the present reference color stored in the memory 44 (step S18). More specifically, the color adjuster 66 adjusts the color values of the present reference color according to an input action made by the user on the adjustment input section 74. The adjusted color values serve as color values of the present reference color, and update the color values of the present reference color stored in the memory 44.

The image shown in FIG. 6 includes displayed right and left sets of adjustment tool bars in a lower portion thereof. The adjustment tool bars are capable of adjusting values of L*, a*, b*, respectively. More specifically, the user operates the adjustment input section 74 in order to horizontally move adjustment knobs 141, 142, 143 at the centers of the adjustment tool bars of the left set, thereby adjusting values of L*, a*, b*. The user can also operate the adjustment input section 74 so as to operate adjustment buttons 151, 152, 153 at right ends of the adjustment tool bars of the right set, thereby directly entering values for L*, a*, b*. The user can thus adjust the color values of the present reference color in order to bring them closer to the color values of the designated color, or closer to the color values of a desired color.

In FIG. 4, after color values of the designated color have been adjusted, the display controller 48 changes the displayed color and the color values that have been mapped by the selected mapping technique in step S12 (step S20). Then, control returns to step S14. In other words, the display controller 48 changes the displayed color and color values that have been mapped by the selected mapping technique in step S12 to the adjusted color and color values, and displays the changed color and color values. The adjusted color is displayed in the display area of the display area 110, which corresponds to the selected mapping technique.

The adjusted color values are displayed on the coordinates in place of the color values that correspond to the selected mapping technique. For example, if the mapping technique based on impression matching is selected, then the position of the point 132 is changed to the position of the adjusted color values. Therefore, the user can visually recognize how the adjusted reference color has been changed, thereby enabling the user to appropriately adjust the color values.

If the gamut inside/outside determining section 60 judges that the color values fall within the range of the gamut in step S4, then the controller 46 sets the color values of the designated color as a reference color (step S22). Thereafter, control proceeds to step S24 in FIG. 5. Color values of the reference color are stored in the memory 44. If the controller 46 judges that the present reference color is OK in step S14, then control proceeds to step S24 in FIG. 5.

Figure 5:
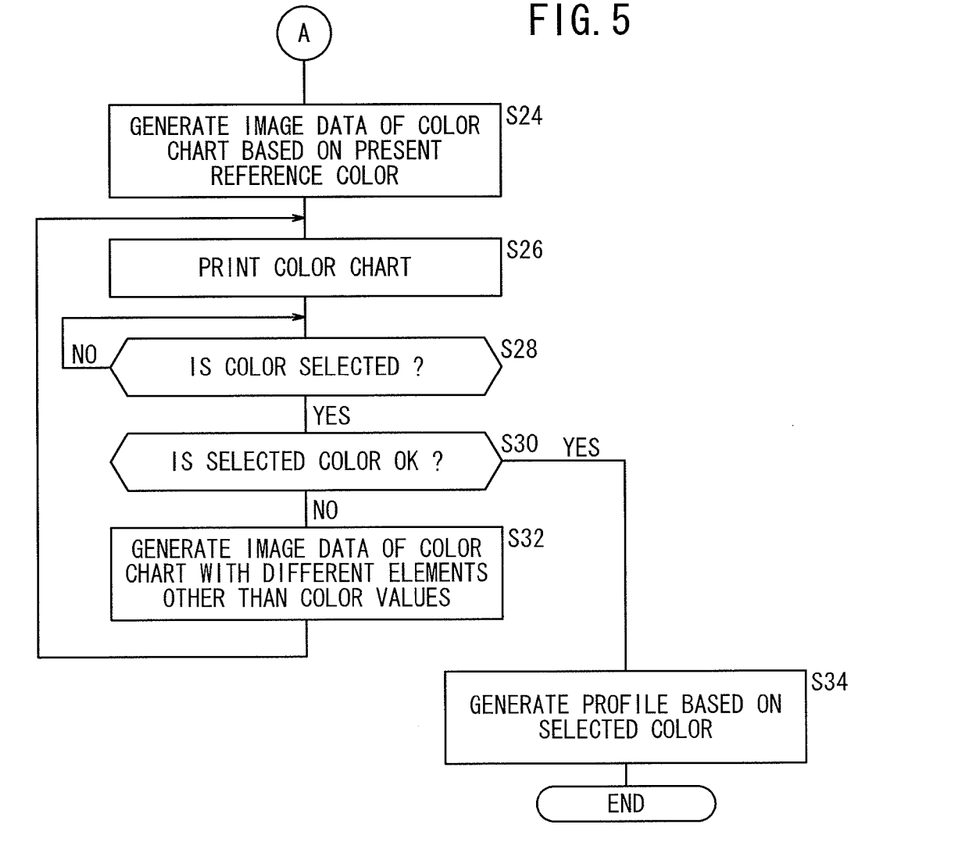

In step S24 in FIG. 5, the image data generator 68 generates image data of a color chart, including color patches having different L*, a*, b* values around the present reference color that is stored in the memory 44. The image data generator 68 is capable of generating image data of a color chart, including color patches having different L*, a*, b* values at given intervals. Alternatively, the image data generator 68 may generate image data of a color chart, including color patches arranged in a matrix.

Then, the print controller 52 controls the printing apparatus 14 in order to print a color chart based on the generated image data (step S26). Initially, the print controller 52 controls the printing apparatus 14 to print a color chart, and the print color converter 70 converts the color values of the image data generated by the image data generator 68 into color values dependent on the printing apparatus 14. The print color converter 70 stores the converted color values in the memory 44. The print controller 52 then controls the printing apparatus 14 to print a color chart based on the converted image data.

Figure 7:
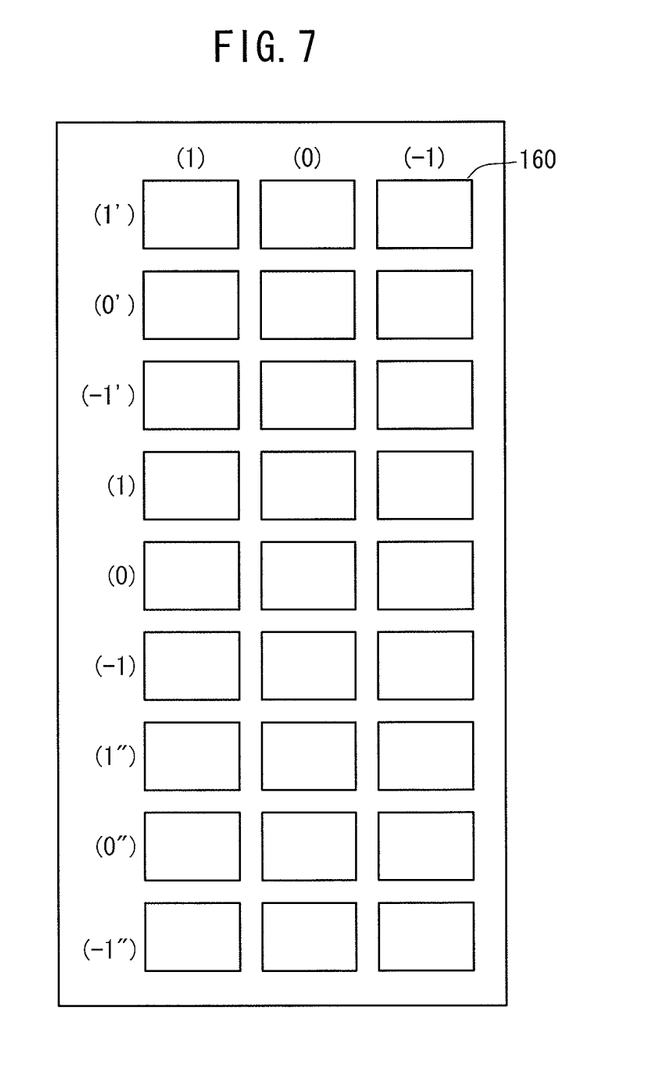
FIG. 7 is a view showing, by way of example, a printed color chart.

FIG. 7 shows a printed color chart by way of example. As shown in FIG. 7, the printed color chart includes a plurality of color patches 160 marked with colors. The color patches 160 have different colors respectively. The color patches 160 are arranged along rows and columns in a matrix, and are disposed at spaced intervals along the rows and columns. The printed color chart includes row numbers and column numbers for assisting identification of the positions of the color patches 160 along the rows and columns. A color patch identified by row number (0) and column number (0) represents the present reference color. A color patch identified by row number (0') and column number (0) and a color patch identified by row number (0") and column number (0) represent colors of color values, which differ from the value of L* of the present reference color, by certain intervals in positive and negative directions.

Nine color patches identified by row numbers (1), (0), (−1) represent colors having color values that are different from the values of a* and b* of the color of the color patch identified by row number (0) and column number (0), by certain intervals in positive and negative directions. The color patches identified by row numbers (1) and (−1) have different values of a*, while the color patches identified by the column numbers (1) and (−1) have different values of b*. Color patches identified by positive row and column numbers have different values in the positive direction, whereas color patches identified by negative row and column numbers have different values in the negative direction.

Nine color patches identified by row numbers (1'), (0'), (−1') represent colors having color values that are different from the values of a* and b* of the color of the color patch identified by row number (0') and column number (0), by certain intervals in positive and negative directions. The color patches identified by row numbers (1') and (−1') have different values of a*, while the color patches identified by the column numbers (1) and (−1) have different values of b*.

Nine color patches identified by row numbers (1"), (0"), (−1") represent colors having color values that are different from the values of a* and b* of the color of the color patch identified by row number (0") and column number (0), by certain intervals in positive and negative directions. The color patches identified by row numbers (1") and (−1") have different values of a*, while the color patches identified by the column numbers (1) and (−1) have different values of b*.

Referring back to FIG. 5, after the color chart is printed in step S26, the controller 46 determines whether or not the user has selected a given color (step S28). The user selects a color by operating the second selector 78 in order to select one of the color patches appearing in the color chart. More specifically, the user selects a color patch by specifying a row number and a column number. If only the present reference color is actually printed, then the printed present reference color may be different from the designated color, or may not match the preferences of the user. Instead, the present reference color and colors in the neighborhood of the present reference color are actually printed, so as to allow the user to select a color closest to the designated color, or a color desired by the user. Consequently, a color that is identical or close to the designated color outside of the range of the gamut can be printed.

If the controller 46 judges that the user has not selected a color in step S28, then step S28 is repeated until a color is selected. If the controller 46 judges that the user has selected a color in step S28, then the controller 46 determines whether or not the selected color is OK, based on an input action made by the user on the input device 26 (step S30). The controller 46 stores color values of the selected color in the memory 44.

If the controller 46 judges that the selected color is not OK in step S30, then the image data generator 68 generates image data of a color chart, including a plurality of color patches having elements other than the color values, which are different from those of the color selected in step S28 (step S32). Elements other than the color values, which are different from those of the selected color, refer to different light sources, different print medium materials, or the like, for example, rather than color values such as L*, a*, b*. A color tends to look different to the eye when printed with different light sources or different print medium materials. Therefore, image data of a color chart are generated, in which the color chart contains colors that appear with different elements, such as different light sources, different print medium materials, or the like, rather than the color values.

If the image data generator 68 generates image data of a color chart with different light sources, then the image data generator 68 generates image data of a color chart, including a plurality of color patches which represent the color selected in step S28 as a color under a light source at a reference color temperature, and colors under light sources at different color temperatures. The reference color temperature may be 5000 K (D50), for example.

If the image data generator 68 generates image data of a color chart with different print medium materials, then the image data generator 68 generates image data of a color chart, including a plurality of color patches that represent the color selected in step S28, as a color printed on a print medium of a reference material and colors printed on print mediums of different materials. More specifically, a color tends to look different when printed on different print medium materials. Therefore, color chart image data are generated, in which the color chart contains colors that appear different from the color selected in step S28, with a plurality of predetermined different print medium materials. The color chart is then printed based on the generated image data in order to allow the user to recognize how the color selected in step S28 is printed on a plurality of different print medium materials, and hence how the color selected in step S28 changes depending on the print medium. In other words, changes that occur to the color on different print medium materials are simulated, and image data of a color chart are generated, including a plurality of color patches that differ from the color selected in step S28 based on the simulated changes.

After image data of the color chart are generated in step S32, control returns to step S26. In step S26, the color chart, whose image data has just been generated, is printed. Based on the printed color chart, the user selects a color (step S28). If the selected color is OK (step S30), then the profile generator 72 corrects the profile corresponding to the mapping technique selected in step S10, to result in a profile in which the designated color is the selected color that was judged to be OK (step S34). By mapping color values using the generated profile, the designated color that lies outside the range of the gamut can still be printed exactly, or as a color desired by the user.

If step S32 is carried out in a next cycle after the same step was carried out in the previous cycle, then a color chart, with elements that differ from those in the previous cycle, may be generated. For example, if a color chart was generated with different light sources in the previous cycle, then a color chart with different print medium materials may be generated. Alternatively, a color chart, with elements that are varied in a manner different from the previous cycle, may be generated. For example, if light source color temperatures were different by 300 K in the previous cycle, then the light source color temperatures may be different by 200 K in the next cycle.

In the above embodiment, the mapping techniques include the mapping technique based on saturation matching. However, instead of the mapping technique based on saturation matching, a mapping technique based on saturation emphasis may be employed. A mapping technique based on saturation emphasis refers to a mapping technique with emphasis applied to saturation. For example, such a mapping technique may be a mapping technique for minimizing color differences within a range of saturation shifts permitted based on saturation matching. Further, the mapping technique based on lightness matching may be replaced with a mapping technique based on lightness emphasis. A mapping technique based on lightness emphasis refers to a mapping technique with emphasis applied to lightness. For example, such a mapping technique may be a mapping technique for minimizing color differences within a range of lightness deviations permitted based on lightness matching.

In the above embodiment, in step S8, the display controller 48 simultaneously displays the designated color and the mapped colors in positions adjacent to each other on the display unit 24. However, the display controller 48 may display the designated color and the mapped colors in positions that are not adjacent to each other. Alternatively, as shown in FIG. 8, the display controller 48 may simultaneously display a mode in which the mapped colors are adjacent to the designated color, and a mode in which the mapped colors are not adjacent to the designated color.

Figure 8:
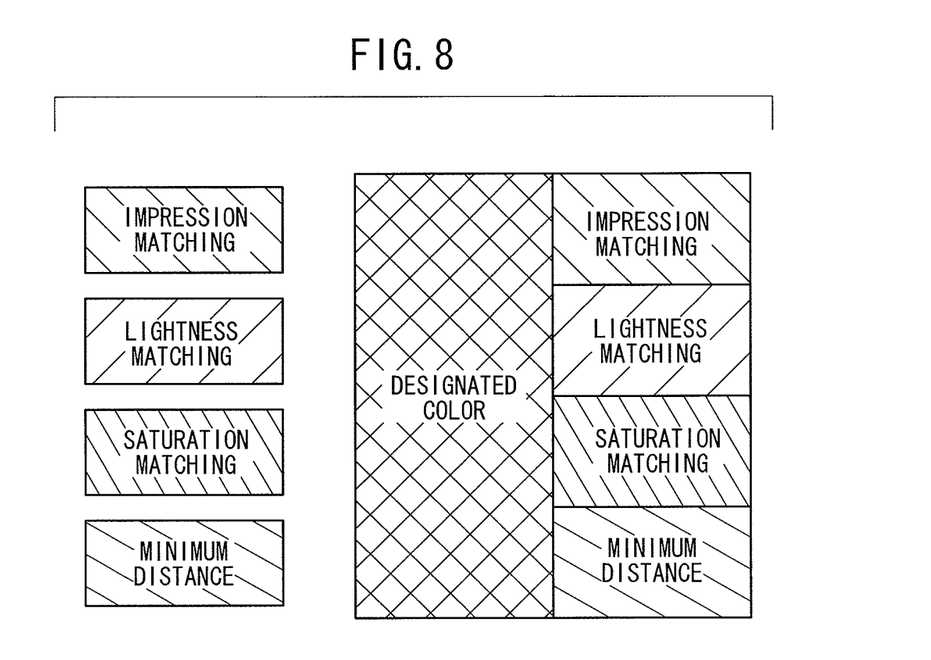
FIG. 8 is a diagram showing simultaneous display of a designated color and a plurality of designated colors after being mapped.

The display area indicated by "DESIGNATED COLOR" in FIG. 8 displays the designated color. The display area indicated by "IMPRESSION MATCHING" displays the color mapped according to the mapping technique based on impression matching. The display area indicated by "LIGHTNESS MATCHING" displays the color mapped according to the mapping technique based on lightness matching. The display area indicated by "SATURATION MATCHING" displays the color mapped according to the mapping technique based on saturation matching. The display area indicated by "MINIMUM DISTANCE" displays the color mapped according to the mapping technique based on minimum distance. By simultaneously displaying the mapped colors adjacent to the designated color and the mapped colors non-adjacently to the designated color, the impression of the colors displayed adjacent to the designated color and the impression of the colors displayed non-adjacently to the designated color can be observed differently from each other, thereby allowing the user to recognize such an impression difference intuitively.

The display controller 48 also may display an achromatic color as a background color for the designated color and the mapped colors. For example, the display controller 48 may display an achromatic color of 18% gray for appropriate evaluation of the colors. Alternatively, the display controller 48 may display a chromatic color as a background color for the designated color and the mapped colors. The chromatic color may be a color designated by the user or a predetermined color. The designated color displayed against the chromatic background color is easy to adjust in applications such as posters.

Although certain preferred embodiments of the present invention have been shown and described in detail, it should be understood that various changes and modifications may be made to the embodiments without departing from the scope of the invention as set forth in the appended claims.

What is claimed is:

1. A color information processing apparatus comprising:
   a mapping section for mapping a designated color that lies outside of the range of a gamut of a printing apparatus to the range of the gamut according to a plurality of mapping techniques;
   a display device for simultaneously displaying the designated color and a plurality of colors mapped by the mapping section,
   wherein the display device simultaneously displays the designated color and the colors mapped by the mapping section adjacent to each other;
   an image data generator for generating image data of a color chart including a plurality of color patches having different lightness and chromaticity values in a color space around the color mapped according to the one of the mapping techniques, said one mapping technique selected by a first selector; and
   wherein the image data generator further generates second image data of a second color chart including a plurality of color patches, said second color chart being based on the mapping technique selected by the first selector and further corresponding to a color selected by a second selector as a selected color under a light source at a reference color temperature, and the selected color under light sources at different color temperatures from the reference color temperature.

2. A color information processing apparatus according to claim 1, wherein the display device simultaneously displays a mode in which the designated color and the colors mapped by the mapping section are adjacent to each other, and a mode in which the designated color and the colors mapped by the mapping section are not adjacent to each other.

3. A color information processing apparatus according to claim 1, wherein the display device displays an achromatic color as a background color for the designated color and the colors mapped by the mapping section.

4. A color information processing apparatus according to claim 1, wherein the display device displays a chromatic color as a background color for the designated color and the colors mapped by the mapping section.

5. A color information processing apparatus according to claim 1, wherein the mapping section uses at least one of a mapping technique based on impression matching, a mapping technique based on lightness matching, a mapping technique based on saturation matching, and a mapping technique based on minimum distance.

6. A color information processing apparatus according to claim 1, wherein the display device displays, on coordinates, color values of the colors mapped by the mapping section.

7. A color information processing apparatus according to claim 1, further comprising:
   a color adjuster for adjusting a color mapped according to the one of the mapping techniques, which is selected by the first selector.

8. A color information processing apparatus comprising:
   a mapping section for mapping a designated color that lies outside of the range of a gamut of a printing apparatus to the range of the gamut according to a plurality of mapping techniques;
   a display device for simultaneously displaying the designated color and a plurality of colors mapped by the mapping section,
   wherein the display device simultaneously displays the designated color and the colors mapped by the mapping section adjacent to each other;
   an image data generator for generating image data of a color chart including a plurality of color patches having different lightness and chromaticity values in a color space around the color mapped according to the one of the mapping techniques, said one mapping technique selected by a first selector; and
   wherein the image data generator further generates second image data of a second color chart including a plurality of color patches, said second color chart being based on the mapping technique selected by the first selector and further corresponding to a color selected by a second selector as a selected color on a reference print medium, and the selected color printed on different print medium from the reference print medium.

9. A non-transitory recording medium storing a program for enabling a computer to function as:
   a mapping section for mapping a designated color that lies outside of the range of a gamut of a printing apparatus to the range of the gamut according to a plurality of mapping techniques;
   a display device for simultaneously displaying the designated color and a plurality of colors mapped by the mapping section,
   wherein the display device simultaneously displays the designated color and the colors mapped by the mapping section adjacent to each other; and
   an image data generator for generating image data of a color chart including a plurality of color patches having different lightness and chromaticity values in a color space around the color mapped according to the one of the mapping techniques, said one mapping technique selected by a first selector; and
   wherein the image data generator further generates second image data of a second color chart including a plurality of color patches, said second color chart being based on 1) the mapping technique selected by the first selector and further corresponding to a color selected by a second selector as a selected color under a light source at a reference color temperature, and the selected color under light sources at different color temperatures from the reference color temperature or 2) the mapping technique selected by the first selector and further corresponding to a color selected by a second selector as a selected color on a reference print medium, and the selected color printed on different print media from the reference print medium.

* * * * *